United States Patent [19]
Zamansky et al.

[11] Patent Number: 5,756,059
[45] Date of Patent: May 26, 1998

[54] ADVANCED REBURNING METHODS FOR HIGH EFFICIENCY $NO_x$ CONTROL

[75] Inventors: Vladimir M. Zamansky, San Clemente; Peter M. Maly, El Toro; William Randall Seeker, San Clemente, all of Calif.

[73] Assignee: Energy and Environmental Research Corporation, Irvine, Calif.

[21] Appl. No.: 848,773

[22] Filed: May 2, 1997

Related U.S. Application Data

[63] Continuation of Ser. No. 584,035, Jan. 11, 1996, abandoned.

[51] Int. Cl.$^6$ ..................................................... B01J 8/00
[52] U.S. Cl. ..................................................... 423/239.1
[58] Field of Search ........................ 423/239.1; 110/210, 110/214

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,403,941 | 9/1983 | Okiura et al. | 431/10 |
| 4,851,201 | 7/1989 | Heap et al. | 423/235 |
| 4,861,567 | 8/1989 | Heap et al. | 423/235 |
| 5,116,584 | 5/1992 | Chen et al. | 423/235 |
| 5,139,755 | 8/1992 | Seeker et al. | 423/235 |
| 5,224,334 | 7/1993 | Bell | 60/274 |
| 5,270,025 | 12/1993 | Ho et al. | 423/235 |
| 5,443,805 | 8/1995 | Beér et al. | 423/235 |

OTHER PUBLICATIONS

Hsieh, B.C. et al., *An Analysis of Chemistry and Mechanisms for High Temperature Desulfurization of Low BTU Gas When Using Lime or Limestone*, Gilbert Associates, Inc., 1974. (No month).

Chen et al., Advanced Non-Catalytic Post Combustion $NO_x$ Control, Environmental Progress, vol. 10, No. 3,pp. 182–185 (1991). (no month).

Lyon et al., Discovery and Development of the Thermal $DeNO_x$ Process, Ind. Eng. Chem. Fundam., vol. 25, No. 1, pp. 19–24 (1986). (no month).

Miller et al., Mechanism and Modeling of Nitrogen Chemistry in Combustion, Prog. Energy Combust. Sci., vol. 15, pp. 287–338 (1989). (no month).

Gullett, et al., Furnace Slurry Injection for Simultaneous $SO_2/NO_2$ Removal, The 1991 $SO_2$ Control Symposium, vol. 2: Sessions 5A–6B, pp. 87–103 (Dec. 1991).

Eckhart et al., *Cyclone Reburn Using Coal–Water Fuel*, Report DOE/PC/90157-1, sponsored by U.S. Department of Energy and Pittsburgh Energy Technology Center (Oct. 1991).

*Primary Examiner*—Steven Bos
*Assistant Examiner*—Thomas G. Dunn, Jr.
*Attorney, Agent, or Firm*—Workman, Nydegger & Seeley; Gregory M. Taylor, Esq.

[57] ABSTRACT

The present invention is related to methods and systems for preventing the release of nitrogen oxides with combustion flue gases emitted to the atmosphere. The invention is specifically directed to the removal of nitric oxide, nitrogen dioxide, and nitrous oxide from flue gas in stationary combustion systems. The methods of the invention improve efficiency of conventional reburning and advanced reburning processes by two key improvements, including the injection of a reducing agent into the reburning zone and the use of promoters, which considerably enhance $NO_x$ control. The promoters are metal-containing compounds that can be added to the reducing agents. These improvements allow either one or two stages of reducing agent injection for greater $NO_x$ control.

43 Claims, 6 Drawing Sheets

ADVANCED REBURNING METHODS FOR HIGH EFFICIENCY NO$_x$ CONTROL

The present application is a continuation of U.S. application Ser. No. 08/584,035, filed Jan. 11, 1996 now abandoned.

BACKGROUND OF THE INVENTION

1. The Field of the Invention

The present invention is related to methods for preventing the release of nitrogen oxides with flue gases emitted to the atmosphere from stationary combustion systems. More particularly, the invention relates to methods and systems for improving the efficiency of conventional reburning and advanced reburning processes in controlling nitrogen oxide emissions from combustion systems such as boilers, furnaces, incinerators, and the like.

2. The Relevant Technology

The major air pollutants emanating from boilers, furnaces, engines, incinerators, and other combustion sources are nitrogen oxides, including nitric oxide (NO), nitrogen dioxide ($NO_2$), and nitrous oxide ($N_2O$). The total NO and $NO_2$ concentration is typically referred to as $NO_x$. Nitrogen oxides are mainly produced in the form of NO. Some $NO_2$ and $N_2O$ are also formed, but with concentrations of less than about 5% of the NO which is typically about 200–1000 ppm. These air pollutants are the subject of growing concern because these compounds are toxic and are the precursors to acid rain deposition as well as photochemical smog. Nitrous oxide also contributes to the greenhouse effect.

Combustion modifications such as low $NO_x$ burners (LNB) and overfire air (OFA) injection provide only modest $NO_x$ control, on the level of about 30–50%. However, the capital costs of these systems are low and, since no reagents are required, operating costs are near zero. For greater or deeper $NO_x$ control, selective catalytic reduction (SCR), reburning, or selective non-catalytic reduction (SNCR) can be added to low $NO_x$ burners and OFA injection systems, or can be installed as stand alone systems.

Currently, SCR is the commercial technology with the highest $NO_x$ control efficiency. With SCR, $NO_x$ is reduced by reactions with NHi-forming agents (N-agents) such as ammonia, urea, and the like, on the surface of a catalyst. The SCR systems are typically positioned at a temperature of about 700° F. and can relatively easily achieve about 80% $NO_x$ reduction. However, SCR is far from an ideal solution for $NO_x$ control. There are several important problems, with the high cost of SCR leading the list. A large catalyst is required for SCR in the exhaust stream. This large catalyst, as well as its related installation and required system modifications, are expensive. The SCR catalyst life is also limited. Catalyst deactivation, due to a number of mechanisms, typically limits catalyst life to about four years for coal fired applications. The SCR catalysts are also toxic and pose disposal problems. Since the catalyst is the major cost element in the SCR system, catalyst replacement and disposal contributes heavily to the total cost of $NO_x$ control.

Reburning controls $NO_x$ via fuel staging and is a three stage method which involves combustion of a fuel in two stages. Initially, the main portion of the fuel (80–90%) is fired through conventional burners with a normal amount of air (about 10% excess). The combustion process forms a definite amount of $NO_x$. Then, on the second stage, the rest of the fuel (reburning fuel) is added at a temperature of about 2000°–2600° F. into a secondary combustion zone, called the reburning zone, to maintain a fuel-rich environment. In this reducing atmosphere, both $NO_x$ formation and $NO_x$ removal reactions occur. Experimental results indicate that in a specific range of conditions (e.g., equivalence ratio in the reburning zone, temperature and residence time in the reburning zone), the $NO_x$ concentrations can typically be reduced by about 50–70%. In the third stage, OFA is injected at a lower temperature to complete combustion.

Addition of the reburning fuel leads to the rapid oxidation of a portion of the fuel by oxygen to CO and hydrogen. The reburning fuel provides a fuel-rich mixture with certain concentrations of carbon containing radicals such as $CH_3$, $CH_2$, CH, C, HCCO, etc. These active species can participate either in formation of NO precursors in reactions with molecular nitrogen or in reactions with NO. Many elementary steps can share responsibility for NO reduction, and there is no commonly accepted opinion about their importance. The carbon containing radicals ($CH_i$) formed in the reburning zone are capable of reducing NO concentrations by converting NO to various intermediate species with C—N bonds. These intermediate species are reduced in reactions with different radicals into $NH_i$ species ($NH_2$, NH, and N), which react with NO to form molecular nitrogen. Thus, there are two types of chemical reactions for NO removal, including reactions with $CH_i$ radicals and with $NH_i$ radicals. The OFA added during the last stage of the reburning process oxidizes existing CO, $H_2$, HCN, and $NH_3$. The reburning fuel can be coal, gas, or other fuels.

In the SNCR process, the reaction of N-agents with $NO_x$ can proceed without a catalyst at a higher temperature. The SNCR process is effective over a narrow "temperature window" centered at about 1700° F., where the N-agent forms $NH_i$ radicals which react with NO. Under ideal laboratory conditions, fairly deep $NO_x$ control can be achieved with SNCR. However, in practical full scale installations, the effectiveness of SNCR is limited by the non-uniformity of the temperature profile, difficulties of mixing the N-agent across the full boiler cross section, limited residence time for reactions, and ammonia slip. Typically, $NO_x$ control via SNCR is limited to about 40–50%. Thus, while SNCR does not require a catalyst and hence has a low capital cost compared to SCR, it does not provide high efficiency $NO_x$ control. The most common SNCR N-agents are ammonia and urea, and the corresponding processes utilizing these agents are called the thermal DeNO$_x$ process and the NO$_x$OUT process, respectively.

In the thermal DeNO$_x$ process, ammonia is injected into combustion flue gas containing NO and oxygen at a temperature of about 1500°–2000° F. A chemical reaction between these compounds occurs and NO is converted to molecular nitrogen. The reaction starts with the formation of $NH_2$ radicals: $NH_3+OH \rightarrow NH_2+H_2O$ which can also be formed in reactions with O and H atoms: $NH_3+O \rightarrow NH_2+OH$ and $NH_3+H \rightarrow NH_2+H_2$. The main elementary reaction of NO to $N_2$ conversion is: $NH_2+NO \rightarrow N_2+H_2O$.

In the NO$_x$OUT process, urea (($NH_2$)$_2$CO) is injected into the combustion flue gas. The mechanism of urea injection includes the important features of the $NH_3$ and HNCO reactions with NO, because urea is rapidly converted to $NH_3$ and HNCO at high temperatures: $(NH_2)_2CO \rightarrow NH_3+HNCO$. The most important HNCO reactions with radicals are: $HNCO+H \rightarrow NH_2+CO$ and $HNCO+OH \rightarrow NCO+H_2O$. As in the thermal DeNO$_x$ process, $NH_2$ radicals can either remove NO: $NH_2+NO \rightarrow N_2+H_2O$ or form NO via HNO radicals. The NCO radicals can remove NO to form $N_2O$: $NCO+NO \rightarrow N_2O + CO$ and then CO and $N_2O$ molecules are oxidized by OH and H: $CO+OH \rightarrow CO_2+H$ and $N_2O+H \rightarrow N_2+OH$. The NO$_x$OUT process has a narrow temperature window similar to the DeNO$_x$ process using ammonia injection, but can be complicated by N$_2$O formation.

The SNCR temperature window could be broadened to lower temperatures if an alternative source of OH radicals could be found. Attempts to do this have included the addition of hydrogen or hydrogen peroxide to ammonia, the addition of alcohols to urea, etc. The action of most additives is to shift the temperature at which the SNCR reactions are optimum, rather than to broaden the SNCR temperature window. However, it has been discovered that several salt additives considerably broaden the temperature window of the SNCR process.

It has been suggested that urea and ammonia be used for NO$_x$ control under fuel-rich conditions, with the main combustion process utilizing a stoichiometric ratio (SR) of oxygen over fuel lower than one (1), followed by injection of urea or ammonia at temperatures of 1900°–3000° F. and 2500°–3000° F., respectively. These methods have a substantial disadvantage over reburning technologies since fuel-rich combustion results in a reducing environment in the main combustion zone that promotes corrosion of the equipment and increases deposits in the combustion chamber. Reburning provides firing of most of the fuel under fuel-lean conditions and only a small portion of the fuel is fired under fuel-rich conditions in a relatively small part of the furnace, thus substantially reducing corrosion and burner deposits.

The advanced reburning (AR) process, which is a synergetic integration of basic reburning and SNCR, is disclosed in U.S. Pat. No. 5,139,755 to Seeker et al. In the AR process, the N-agent is injected along with the OFA and the reburning system is adjusted to optimize the NO$_x$ reduction due to the N-agent. By adjusting the reburning fuel injection rate to achieve near stoichiometric conditions, instead of the fuel rich conditions normally used for reburning, the CO level is controlled and the temperature window is considerably broadened and deepened. With the AR process, the NO$_x$ control from the N-agent injection is nearly doubled. Furthermore, the widening of the temperature window in the AR process provides flexibility in locating the injection system and the NO$_x$ control should be achievable over a broader boiler operating range.

The AR process provides an approach for increasing the OH concentration to form NH$_2$ radicals from N-agents, and incorporates the chain branching reaction of CO oxidation into the process. When CO reacts with oxygen, it initiates free radicals. Thus, if a controlled amount of CO from the reburning zone is introduced at the point of N-agent injection, the low temperature limitation of the window can be broadened and the NO$_x$ reduction enhanced.

Experimental studies have demonstrated two approaches for addition of OFA in reburning to prepare specific SNCR conditions. One approach was to split the OFA addition and inject it in two stages so that the bulk of the oxidation is completed at the conventional OFA injection stage. A moderate amount of CO is left for burnout at a second injection stage at a lower temperature where conditions are more favorable for DeNO$_x$ reactions. In an alternative approach, the reburning zone was deliberately de-tuned by increasing the stoichiometry to about 0.98–1.0. This allowed a significant reduction in the reburning fuel flow, and eliminated one of the air injection stages.

The conventional AR process, using CO promotion and N-agent injection, shows that the temperature window can be broadened and NO removal efficiency increased, if both CO and O$_2$ concentrations are controlled to fairly low values (CO in the order of 1000 ppm and O$_2$ at less than 0.5 percent). At the point of air addition, CO and O$_2$ are both at low values because of the close approach to SR=1.0.

The chemistry of the AR process is no different than that for basic reburning and SNCR, and the reactions discussed above proceed. The critical difference is how the two sets of chemical reactions are synergistically integrated together. The final OFA initiates the oxidation of CO from the reburning zone: CO+OH→CO$_2$+H, H+O$_2$→OH+O, and O+H$_2$O→OH +OH. This chain branching sequence provides additional OH radicals to initiate the NH$_3$ oxidation sequence: NH$_3$+OH→NH$_2$+H$_2$O and NH$_2$+NO→N$_2$+H$_2$O.

Although the basic AR process is capable of reducing NO concentrations by about 85%, process improvements are still needed to further increase the NO$_x$ control efficiency.

SUMMARY AND OBJECTS OF THE INVENTION

In the view of the present state of the art, it is an object of the present invention to provide improved methods for removing nitrogen oxides from combustion flue gases before being emitted to the atmosphere.

It is another object of the present invention to improve efficiency of the reburning process by injection of N-agents, with or without promoters, into the reburning zone.

It is a further object of the present invention to improve efficiency of the advanced reburning process by addition of promoters to N-agents.

It is still another object of the present invention to increase NO$_x$ control by integrated multiple injection of N-agents, with or without promoters, into the reburning zone and with overfire air injection.

These and other objects and features of the present invention will become more fully apparent from the following description and appended claims, or may be learned by the practice of the invention as set forth hereinafter.

In accordance with the forgoing objects and advantages, the present invention is directed to methods and systems for removal of nitrogen oxides from combustion flue gases emitted to the atmosphere from stationary combustion systems such as boilers, furnaces, incinerators, and the like. The invention improves the efficiency of conventional reburning and advanced reburning processes using nitrogenous, NH$_i$-forming reducing agents (referred to herein as "N-agents" or "reducing agents").

Three methods of the invention are disclosed herein, including (1) promoted advanced reburning (PAR), which uses the addition of promoter compounds to N-agents in advanced reburning systems; (2) promoted advanced reburning-rich side (PAR-rich), which includes the injection of N-agents with or without promoter compounds into the reburning zone; and (3) multiple injection advanced reburning (MIAR), which includes the injection of N-agents with or without promoter compounds into the reburning zone and with overfire air (OFA). These methods form a family of high efficiency NO$_x$ control technologies which are herein collectively referred to as second generation advanced reburning (SGAR). The SGAR technologies are based on two improvements to the conventional advanced reburning (AR) process. These improvements are (1) N-agent injection into the reburning zone, and (2) injection of promoters which enhance the effectiveness of the N-agents in the reburning zone and in the OFA zone.

The PAR method for reducing nitrogen oxides in combustion flue gas comprises injecting and mixing a reburning fuel at a temperature of about 1900°–3000° F. into the combustion flue gas including oxygen and nitrogen oxides in a reburning zone. The resulting mixture of reburning fuel and combustion flue gas is then passed into an overfire air zone. A stream of overfire air is introduced, in one or two stages, at a temperature in a range from about 1100°–2400° F. into the overfire air zone. The stream includes in the last stage a reducing agent capable of providing a source of nitrogenous reducing species and a promoter compound for enhancing the effectiveness of the reducing agent. The reducing agent is allowed to react within the combustion flue gas for a sufficient time to substantially reduce the nitrogen oxides in the combustion flue gas.

The PAR-rich method for reducing nitrogen oxides in combustion flue gas comprises injecting and mixing a reburning fuel at a temperature of about 1900°–3000° F. into a reburning zone containing combustion flue gas including oxygen and nitrogen oxides. The reburning fuel is allowed to react within the combustion flue gas for a sufficient time to remove a substantial portion of the oxygen, thereby forming a fuel rich area in the reburning zone. A reducing agent, with or without a promoter compound, is then injected into the combustion flue gas in the fuel rich area, with the reducing agent capable of providing a source of nitrogenous reducing species. The reducing agent is allowed to react within the combustion flue gas for a sufficient time to substantially reduce the nitrogen oxides in the combustion flue gas. A stream of overfire air at a temperature of about 1100°–2400° F. is then introduced into the combustion flue gas.

The MIAR method for reducing nitrogen oxides in combustion flue gas comprises injecting and mixing a reburning fuel at a temperature of about 1900°–3000° F. into the combustion flue gas including oxygen and nitrogen oxides in a reburning zone. The reburning fuel is allowed to react within the combustion flue gas for a sufficient time to remove a substantial portion of the oxygen, thereby forming a fuel rich area in the reburning zone. A reducing agent, with or without a promoter compound, is then injected into the combustion flue gas in the fuel rich area and is allowed to react within the combustion flue gas for a sufficient time to substantially reduce the nitrogen oxides in the combustion flue gas. A stream of overfire air at a temperature of about 1100°–2400° F. is then introduced into the combustion flue gas, in one or two stages, with injection of additional reducing agent, with or without a promoter compound, in the last stage of OFA injection.

The present invention provides improved $NO_x$ control by having the N-agent appear in the reaction media within a certain time delay after injection of the reburning fuel. Additionally, the use of promoters with the N-agents substantially increases the efficiency of $NO_x$ control. By the optimum combination of fuel/air/N-agent/promoter injection processes, the present invention enhances the efficiency of conventional reburning and advanced reburning processes for greater or deeper $NO_x$ control, which is on the same level or higher than that obtained by conventional catalytic systems.

BRIEF DESCRIPTION OF THE DRAWINGS

In order to more fully understand the manner in which the above-recited and other advantages and objects of the invention are obtained, a more particular description of the invention briefly outlined above will be rendered by reference to the appended drawings. Understanding that these drawings are not to be considered limiting of its scope, the invention will be described and explained with additional specificity and detail through the use of the accompanying drawings in which.

DETAILED DESCRIPTION OF THE INVENTION

Figure 1D:
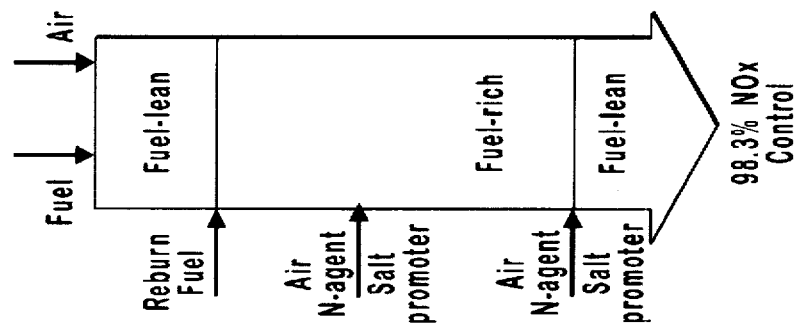
FIGS. 1A–1D are process diagrams comparing the maximum achievable $NO_x$ reduction levels for the basic advanced reburning process and different variants of the second generation advanced reburning methods of the present invention, in which a conventional 10% gas reburning provides 45% $NO_x$ control.

The present invention is directed to methods and systems for removal of nitrogen oxides from combustion flue gases emitted to the atmosphere from stationary combustion systems. In particular, the invention improves the efficiency of conventional reburning and advanced reburning processes using $NH_i$-forming reducing agents (referred to herein as "N-agents" or "reducing agents"), which are capable of providing a source of nitrogenous reducing species.

As will be appreciated by consideration of the following description as well as the accompanying Figures, the inventive concepts of the present invention may be embodied in different forms. The embodiments described herein represent a demonstration mode for carrying out the invention. Nevertheless, many embodiments or variations thereof, other than those specifically detailed herein, may be used to carry out the inventive concepts described herein.

The present invention includes three methods: (1) promoted advanced reburning (PAR), which uses the addition of promoter compounds to N-agents in advanced reburning systems; (2) promoted advanced reburning-rich side (PAR-rich), which includes the injection of N-agents with or without promoter compounds into the reburning zone; and (3) multiple injection advanced reburning (MIAR), which includes the injection of N-agents with or without promoter compounds into the reburning zone and with overfired air (OFA). These methods form a family of high efficiency $NO_x$ control technologies which are herein collectively referred to as second generation advanced reburning (SGAR). The SGAR technologies of the invention are based on two improvements to the conventional advanced reburning (AR) process. These improvements are (1) N-agent injection into the reburning zone, and (2) injection of promoter additives which enhance the effectiveness of the N-agents in the reburning zone and in the OFA zone.

In the conventional AR process, the N-agent is injected with the OFA. In the development of the present invention, it was realized that N-agent injection within the reburning zone can further achieve significant $NO_x$ control. The chemistry of N-agent injection into the reburning zone is considerably different from the normal SNCR fuel lean chemistry. In the reburning zone, the initial $NO_x$ reduction reactions occur rapidly once the reburn fuel and furnace gases are contacted. Following an initially rapid $NO_x$ reduction, the subsequent $NO_x$ decay rate is slow since the radical pool has been depleted. If a N-agent is injected after a suitable time delay following the reburn fuel, the $NO_x$ reduction reactions are re-started and increase the overall level of $NO_x$ reduction beyond that of reburning alone. The overall performance is sensitive to several details of the process. For example, early injection contacts the N-agent with residual oxygen, thereby increasing $NO_x$, while late injection of the N-agent reduces the time available for NO decay.

The use of certain promoter additives can affect the chemical reactions in a manner similar to the effect of CO in the AR process, in that the width of the temperature window is broadened and greater $NO_x$ control is achieved when a given N-Agent injection rate is increased. The promoters are inorganic compounds that can be added in small quantities to an N-Agent solution or in other ways described in more detail below. For example, an inorganic salt such as sodium carbonate ($Na_2CO_3$) can be used as a promoter, which is non-toxic and readily available. The promoters enhance the influence of N-Agents in both the reburning zone and the OFA zone.

With the use of these two improvements in the present invention, the $NO_x$ control increases far beyond the conventional AR process levels.

The PAR method of the invention for reducing nitrogen oxides in combustion flue gas comprises the injection and mixing of a reburning fuel into flue gas emanating from a main combustion zone into a reburning zone and containing oxygen and nitrogen oxides. The reburning fuel is allowed to react within the flue gas for a sufficient time to reduce nitrogen oxides. The resulting mixture is then passed into an overfire air zone. A stream of overfire air is introduced, in one or two stages into the overfire air zone, with the last stage including a reducing agent (N-agent) and a promoter compound for enhancing the effectiveness of the reducing agent. The reducing agent is allowed to react within the flue gas for a sufficient time to substantially reduce the nitrogen oxides in the flue gas.

The PAR-rich method for reducing nitrogen oxides in combustion flue gas comprises the injection and mixing of a reburning fuel into flue gas emanating from a main combustion zone into a reburning zone. The reburning fuel is allowed to react within the flue gas for a sufficient time to remove a substantial portion of the oxygen, thereby forming a fuel rich area in the reburning zone. A reducing agent, with or without a promoter, is then injected into the flue gas in the fuel rich area. The reducing agent may be formed or released from the reburning fuel as discussed in further detail below. The reducing agent is allowed to react within the flue gas for a sufficient time to substantially reduce the nitrogen oxides in the flue gas. A stream of overfire air is then introduced into the flue gas.

The MIAR method for reducing nitrogen oxides in combustion flue gas comprises the injection and mixing of a reburning fuel into flue gas emanating from a main combustion zone into a reburning zone. The reburning fuel is allowed to react within the flue gas for a sufficient time to remove a substantial portion of the oxygen, thereby forming a fuel rich area in the reburning zone. A reducing agent, with or without promoters, is then injected into the flue gas in the fuel rich area. The reducing agent may be formed or released from the reburning fuel. The reducing agent is allowed to react within the flue gas for a sufficient time to substantially reduce the nitrogen oxides in the flue gas. A stream of overfire air is then introduced into the flue gas, in one or two stages, with injection of additional reducing agent, with or without a promoter, in the last stage of OFA injection.

The methods of the present invention can be applied to any combustion device. These include power plants, industrial boilers, process furnaces, magnetohydrodynamic (MHD) combustors, incinerators, engines, and any combinations thereof.

Figure 1C:
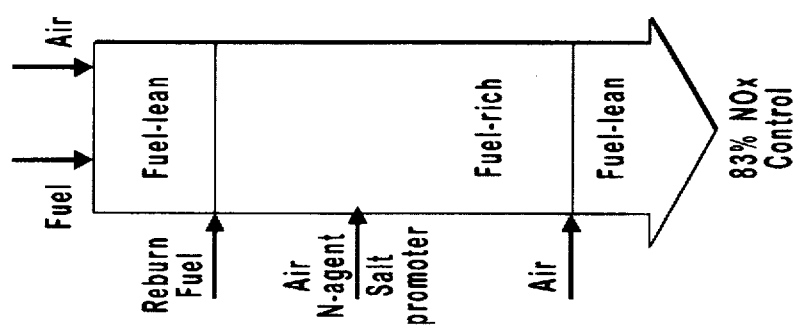
Figure 1B:
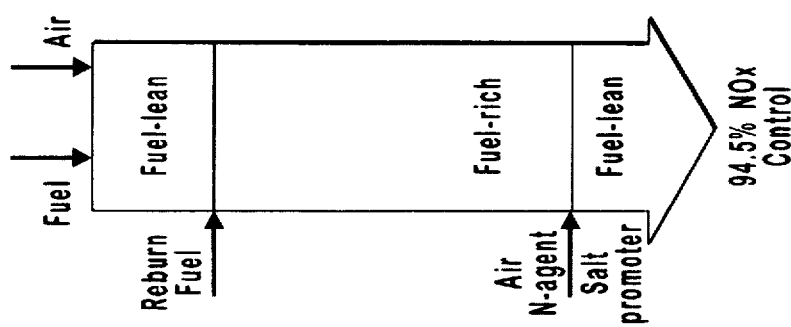
Figure 1A:
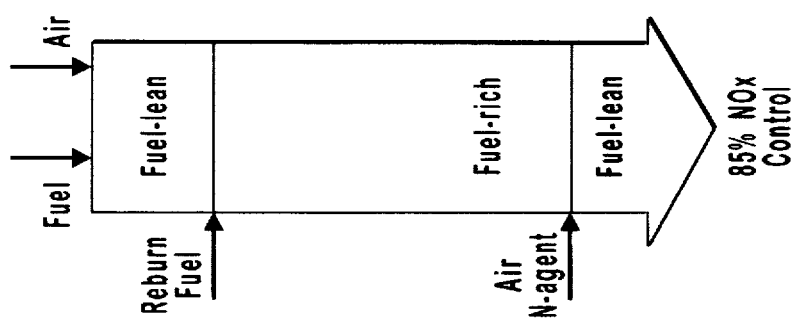

FIGS. 1A–1D are process diagrams representing a comparison of maximum achievable $NO_x$ reduction levels for the basic advanced reburning process and different variants of the SGAR methods of the present invention, in which a conventional 10% gas reburning provides 45% $NO_x$ control. FIG. 1A is a representation of the conventional AR process, while FIGS. 1B, 1C, and 1D are representations of the PAR method, the PAR-rich method, and the MIAR method, respectively. One-stage OFA injection was used in all the SGAR methods, with injection of about 10% reburning fuel. The addition of OFA in two stages is also possible within the scope of the present invention, as described above.

The $NO_x$ control levels set forth in FIG. 1A of 85%, in FIG. 1B of 94.5%, in FIG. 1C of 83%, and in FIG. 1D of 98.3% are based on experimental data obtained in a 1 MBtu/hr Boiler Simulator Facility (BSF). Some of this data is presented and detailed in Examples 3 and 4 below. The conditions used were as follows: natural gas firing of 0.7–1 MMBtu/hr. at SR=1.1; 10% gas reburning at SR=0.99; overfire air having a temperature of 1800° F. at SR=1.2; initial NO concentration of 500–530 ppm; N-agent was aqueous ammonia; fuel-rich N-agent injection delay of 0.25 seconds after reburning fuel; N-agent/NO ratio of 1.5; promoter ($Na_2CO_3$) concentration of 10–100 ppm. The $NO_x$ control for the SGAR methods in FIGS. 1B, 1C, and 1D ranged from 83% to 98.3% in stand alone systems, with the MIAR method providing the greatest $NO_x$ control, followed by the PAR method.

Figure 2:
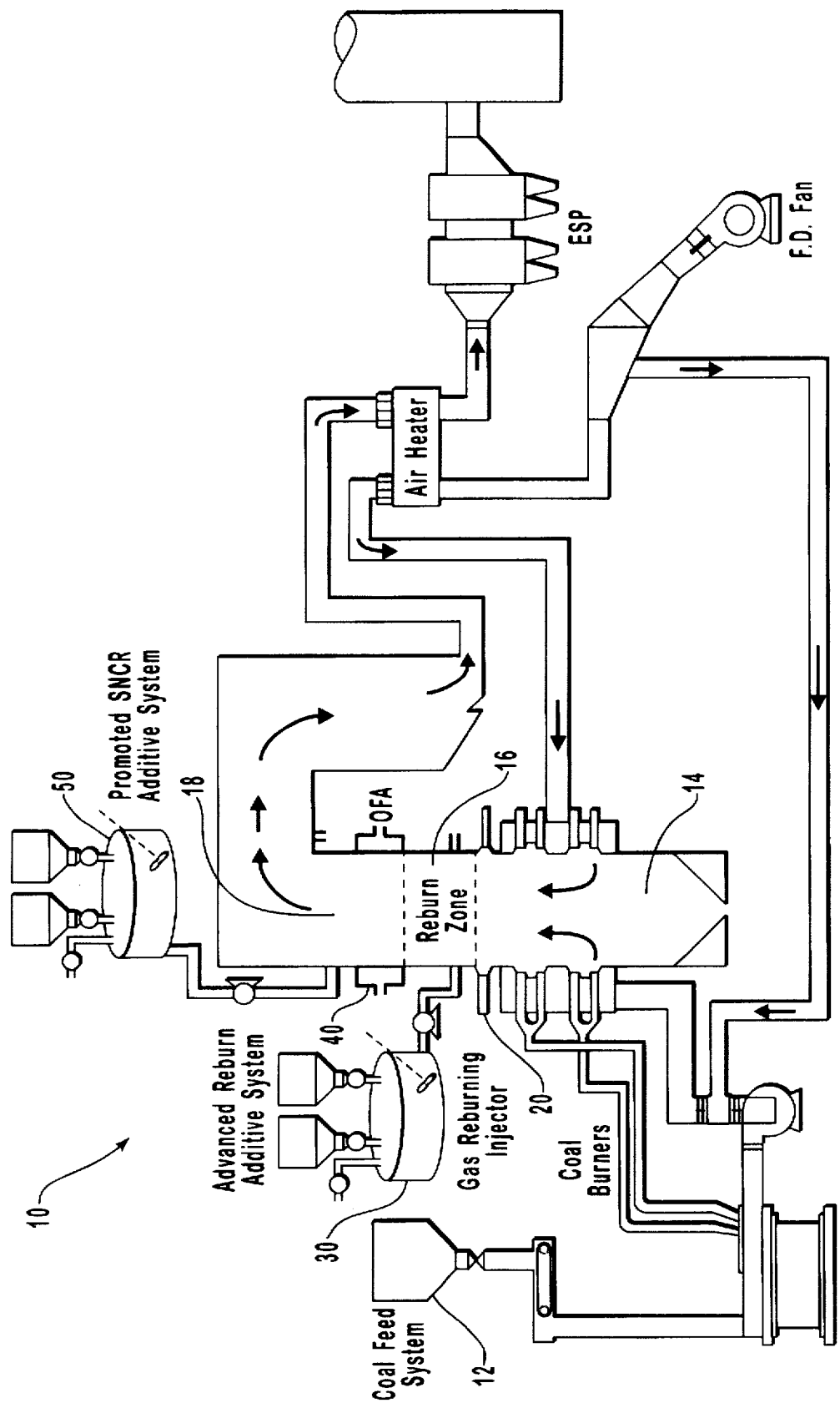
FIG. 2 is a schematic diagram representing an embodiment of a system utilizing the second generation advanced reburning technology of the present invention.

FIG. 2 is a schematic diagram representing an embodiment of an SGAR system 10 of the present invention applied to a coal fired power plant. A tangentially fired boiler is illustrated, but the SGAR technology is equally applicable to all firing configurations. An electrostatic precipitator (ESP) for removing particulate matter, and a forced draft (F.D.) fan for forcing flue gas through system 10 are also depicted. The system 10 includes generally a reburning fuel injector 20, a reburn zone additive system 30, overfire air ports 40, and an overfire air promoted additive system 50.

In using system 10, a coal feed system 12 supplies coal to the coal burners, which include a main combustion zone 14. Combustion flue gas containing oxygen and nitrogen oxides emanates from main combustion zone 14 and is directed into a reburn zone 16 where a reburn fuel is injected from fuel injector 20 into the flue gas. A N-agent, with or without a promoter, can then be injected into the flue gas in the reburn zone from additive system 30 after a predetermined time delay. A stream of overfire air is introduced into the combustion flue gas in overfire air zone 18, in one or two stages, from overfire air ports 40. Injection of additional N-agent, with or without a promoter, can be done in the last stage of OFA injection from additive system 50.

Examples of reburn fuels that can be used in reburning fuel injector 20 include natural gas, coal, oil, biomass, municipal and industrial waste products, their pyrolysis or gasification products, and/or other combustibles, or mixtures of these or various other fuels. Associated pipelines, pulverization equipment, and control devices may be employed with fuel injector 20. The amount of reburn fuel supplied by fuel injector 20 can be in the range from about 1–25%, and preferably from about 10–20% of the total fuel supply.

The reburn zone additive system 30 can be similar to a conventional SNCR injection system, except that a promoter or promoters can be added to the N-agents. The N-agents and promoters can be injected from additive system 30 as solutions, slurries, solid particles, molten substances, gaseous products, or mixtures thereof. The N-agents and promoters can be distributed by nitrogen, steam, air, recirculation gases, reburning fuel, pyrolysis gases, mixtures thereof, or by other distribution means.

The overfire air ports 40 employed in system 10 are similar to conventional overfire air ports except that their location is optimized for the N-agent injection. Also, overfire air ports 40 are designed for rapid mixing.

The overfire air promoted additive system 50 is a second injection system that injects the promoted N-agent into flue gas. The N-agent can also be used without promoters. The N-agents and promoters can be injected from additive system 50 as solutions, slurries, solid particles, molten substances, gaseous products, or mixtures thereof. The N-agents and promoters can be distributed in nitrogen, steam, air, recirculation gases, mixtures thereof, or by other distribution means. The N-agents and promoters injected into reburning zone 16 and overfire air zone 18 can share storage tanks, controls, etc.

The injection temperature of the reburning fuel used in the present invention can vary within the range from about 1900° F. to about 3000° F., and is preferably from about 2200° F. to about 2800° F. The oxygen/fuel stoichiometric ratio (SR) in the reburning zone should be the same as used for the AR process, which is in the range from about 0.75 to about 1.1, and preferably the SR is in the range from about 0.8 to about 1. However, even under total fuel-lean conditions (SR=1.00–1.05), large zones with not completely mixed fuel and oxygen can exist, and $NO_x$ control via reburning reactions will proceed in these zones. Pressure is not an important parameter for efficiency of reburning reactions, and can vary depending on the application from about 0.2 to 80 atm.

The N-agents or reducing agents used in the present invention are compounds that form $NH_i$ radicals (N, NH, $NH_2$) in the reactive media. Examples of compounds that be utilized as N-agents include urea, ammonia, cyanuric acid, ammonium sulfate, ammonium bisulfate, ammonium sulfite, ammonium bisulfite, ammonium formate, ammonium carbonate, ammonium bicarbonate, biuret, triuret, ammelide, mixtures thereof, or other precursors of $NH_i$ radicals. Such precursors can be nitrogenous compounds that are constituent parts of various fuels or other natural products. For instance, coal, biomass, and various waste streams can contain nitrogen compounds.

The N-agents can be either constituent parts of a reburning fuel or can be formed from a reburning fuel via chemical or physical processes. These compounds can be released or formed from different fuels or other natural products by processes such as pyrolysis, gasification, physical or chemical separation, or by other techniques in a separate reactor before injection. The N-agents can also be released or formed from a reburning fuel directly in the reburning zone with a time delay which is defined by the rates of release or formation of the N-agents from the reburning fuel.

The promoters used in the present invention include compounds of lithium, sodium, potassium, magnesium, barium, calcium, zinc, aluminum, as well as combinations or mixtures thereof. More particularly, the promoters can be various oxides, hydroxides, carbonates, sesquicarbonates, bicarbonates, phosphates, silicates, nitrates, formates, acetates, benzoates, citrates, gluconates, aluminates, and borates of the above metals, as well as chemical combinations and mixtures thereof. The promoters can be constituent parts of fuels or example, coal, biomass and various waste streams can contain alkali compounds.

The promoter compounds employed in the present invention can be added to solutions of N-agents, or to solid, liquid or gaseous N-agents. The promoters can also be injected with a reburning fuel, and can be either constituent parts of the reburning fuel or can be formed from a reburning fuel via chemical or physical processes. Promoter compounds can be released or formed from different fuels or other natural products by processes such as pyrolysis, gasification, physical or chemical separation, or by other techniques in a separate reactor before injection. The promoters can also be formed from the reburning fuel directly in the reburning zone with a time delay which is defined by the rates of release or formation of the promoters from the reburning fuel.

The N-agent and/or promoter in the form of a solution, a slurry, solid particles, or a molten substance can be injected along with the reburning fuel. The N-agent and/or promoter are formed as gaseous products in the reburning zone due to melting, vaporization, or chemical processes. This provides a time delay for substantial removal of the oxygen.

The addition of N-agents into the reburning zone significantly improves $NO_x$ reduction if the $NH_i$ species are produced shortly after introduction of the reburning fuel. When fuel is added to the reburning zone, the oxygen disappears very fast in the reaction with the fuel. If $NH_i$ precursors in the form of N-agents are injected into the reburning zone, they can react either with $O_2$ to form NO or with NO to form $N_2$. The NO reduction process is effective if the NHi precursors appear in the gas mixture when the concentration of oxygen has been significantly depleted by the reburning fuel, thus preventing oxidation to NO. Calculated characteristic times for $O_2$ disappearance after the injection of the reburning fuel are less than 0.01 s at 2500° F. and about 0.1 s at 2150° F. at instant mixing. This means that for effective NO reduction, the delay between injection of a reburning fuel and the formation of $NH_i$ species should exceed these times plus the mixing time of the reburning fuel with flue gas. In practice, this delay typically should be in the range of out 0.01 to about 1 second, preferably about 0.1 to about 0.5 seconds, depending on injection temperature and mixing conditions. The results of calculations which demonstrate the effect of NO reduction by gas reburning in the presence of $NH_3$ are presented in Example 1 below.

The delayed introduction of the N-agent, with or without promoters, can be accomplished in various ways. These include physically separating the injection of $NH_i$ precursors (N-agents) from the injection of the reburning fuel. Another way to delay introduction is to utilize an aqueous solution of an N-agent which is injected in the form of a droplet cloud along with the reburning fuel. The evaporation time of the aqueous droplets and N-agent decomposition time can provide the delay time necessary for the consumption of oxygen in the reburning zone. This delay time can be controlled by adjusting the droplet size to vary the rate of evaporation of the droplets.

The delayed introduction of N-agents, with or without promoters, can also be conducted by injection of solid particles including N-agents. For instance, N-agents can be constituent parts of coal, biomass, and various waste streams. After the injection of solid particles, such as coal, biomass, etc., into the reburning zone, the particles are vaporized and N-agents can be released or formed at high temperatures in the reburning zone with a certain delay time relative to the injection of the reburning fuel. This delay time will depend upon the size of the particles and their physical and chemical properties. Another way of creating delay for consuming oxygen in the reburning zone can be provided by delayed and controlled mixing of the N-agent, with or without promoters, with the gas flow in the reburning zone. In this case, the flows of reburning fuel as well as N-agents and/or promoter can be injected at the same distance from the main combustion zone, but through injector devices that are designed so as to provide, first, the contact of the reburning fuel with the flue gas from the main combustion zone, and then contact of the flue gas under fuel rich or stoichiometric conditions with the N-Agent and promoter.

The amount of N-agent in the reburning zone should be substantially lower than the $NO_x$ concentration coming out of the main combustion zone since the $CH_i+NO$ reactions proceed during the delay time between injection of the reburning fuel and injection or formation of the N-agents. The N-agent concentration should be comparable with the amount of NO which is left after completing the $CH_i+NO$ reactions. Since the typical efficiency of reburning reactions is about 50%, the amount of N-agent that should be added to the NO concentration from the main combustion zone should result in a nitrogen stoichiometric ratio (NSR) in the range from about 0.5 to about 1. The NSR is a molar ratio of nitrogen in the N-agent to NO. In general, depending on other conditions, the NSR can vary from about 0.2 to about 2.

The amount of promoters in both the reburning and OFA zones should be lower than the amount of N-agents. Typically, the promoter to N-agent molar ratio should be in the range from about 0.01 to about 1, and preferably in the range from about 0.03 to about 0.3. The promoters do participate in the processes of the invention, but their role is to provide a radical pool which will initiate chain reactions of NO removal. Therefore, high concentrations of promoters should be avoided since this will cause unreasonable consumption of the promoters. On the other hand, the amount of promoters should be high enough to increase the radical pool and consequently $NO_x$ reduction.

The time period between the injection of the reburning fuel and the OFA (i.e., the residence time in the reburning zone) is an important factor that affects process efficiency. Typically, available residence time in coal fired boilers is in the range from about 0.3 to about 1.2 seconds. Depending on temperature profiles, the residence time should be kept as long as possible to complete the reactions in the reburning zone. However, if the OFA injection temperature is too low, this will increase concentrations of CO and other combustibles in the flue gas. Therefore, the temperature range for OFA injection should be in the range from about 1100° F. to about 2400° F., and preferably from about 1600° F. to about 2200° F.

The OFA can be injected with a N-agent as discussed above. The amount of this N-agent added to the OFA zone should be comparable with the amount of NO left at the injection temperature. Thus, the nitrogen stoichiometric ratio (NSR) in the OFA zone should be in the range from about 0.5 to about 3, and preferably from about 1 to about 2. Promoters injected with the N-agent should be in lower amounts relative to the N-agent, with the molar ratio of promoter to N-agent being about 0.01 to about 1, and preferably about 0.03 to about 0.3. The promoters increase the efficiency of the N-agent in the OFA zone and also reduce slips of ammonia and other nitrogenous compounds. The promoters are also capable of reducing $N_2O$ concentrations. If considerable amounts of $N_2O$ are present in the flue gas, the concentration of the promoters should be increased up to the molar ratio of promoter to $N_2O$ of about 1.5.

In comparison with prior methods, the present invention has several advantages. The prior methods assume fuel-rich combustion in the main combustion zone which results in increased corrosion of the equipment and deposits in the combustion chamber. The reburning technology of the invention provides firing for most of the fuel under fuel-lean conditions and only a small portion of the fuel is fired under fuel-rich conditions in a relatively small part of the furnace, thus substantially reducing corrosion and burner deposits. This provides $NO_x$ control with fuel-rich conditions and better organization of the process under fuel-lean conditions in the main combustion zone. Furthermore, the present invention allows lower concentrations of N-agents relative to NO amounts coming out of the main combustion zone, since a part of the NO disappears in the reactions with $CH_i$ radicals. Hence the N-agent concentration is lower, resulting in smaller amounts of ammonia that can survive and potentially be converted to NO at lower temperatures. In addition, the SGAR technologies of the invention do not create secondary pollutants and can be integrated with $SO_2$ and air toxics control methods.

The present invention provides improved $NO_x$ control by having the N-agent appear in the reaction media within a certain time delay after injection of the reburning fuel. Additionally, the use of promoters with the N-agents substantially increases the efficiency of $NO_x$ control. By the optimum combination of fuel/air/N-agent/promoter injection processes, the present invention enhances the efficiency of conventional reburning and advanced reburning processes for greater or deeper $NO_x$ control, which is on the same level or higher than that obtained by conventional catalytic systems.

EXAMPLES

The following examples are given to illustrate the methods and systems of the present invention, and are not intended to limit the scope of the present invention.

Some of the experimental data outlined in the Examples below demonstrate that promoters such as $Na_2CO_3$ can promote the effect of N-agents, broaden the temperature window, and reduce the NO concentration in both the reburning and OFA zones. Although the precise mechanisms of promotion are not fully understood at present, the promotion effect of the promoters was demonstrated experimentally and by kinetic modeling via different hypothetical reaction mechanisms. Modeling results are presented in Examples 1 and 2, which involve hypothetical sodium reactions and qualitatively explain the experimental results. Several hypothetical sodium reactions with flue gas components to promote NO reduction can be suggested, for instance:

1. Sodium atoms formed during $Na_2CO_3$ decomposition react with ammonia followed by dissociation of sodium amide and the NO reaction with the $NH_2$ radicals: $Na+NH_3 \rightarrow NaNH_2+H$; $NaNH_2+M \rightarrow Na+NH_2+M$; $NH_2+NO \rightarrow N_2+H_2O$.

2. Sodium carbonate dissociates at high temperatures to different oxides, for example: $Na_2CO_3 \rightarrow NaO+Na+$ $CO_2$; $Na_2CO_3 \rightarrow Na_2O + CO_2$, and the sodium oxides react with ammonia via chemical equations: $NaO + NH_3 \rightarrow NaNH_2 + OH$, $Na_2O + NH_3 \rightarrow NaO + NaNH_2 + H$, and $Na_2O + NH_3 \rightarrow NaOH + NaNH_2$ followed by the sodium amide decomposition.

3. Sodium atoms and sodium oxides react with $H_2O$ and $O_2$: $Na + H_2O \rightarrow NaOH + H$; $Na + O_2 + M \rightarrow NaO_2 + M$; $NaO_2 + H \rightarrow NaO + OH$; $NaO + H_2O \rightarrow NaOH + OH$, and OH radicals form $NH_2$ radicals from ammonia $OH + NH_3 \rightarrow NH_2 + H_2O$.

Although it is unknown which of the sodium reactions are most important, it can be seen that the effect of all these processes is formation of $NH_2$ and H (or OH) radicals at a faster rate than that of ammonia decomposition in flue gas without sodium additives.

Complex chemical reactions occur by a series of elementary reaction steps. If the rate constants of such steps are known, a theoretical kinetic mechanism can be developed and used to calculate the behavior of the reaction under any set of conditions. A mechanism describing the chemical processes that occur in the present invention is assumed in the examples set forth below. The mechanism was based on the scheme suggested in an article by James A. Miller and Craig T. Bowman, *Mechanism and Modeling of Nitrogen Chemistry in Combustion*, 15 Prpg. energy Combust. Sci. 287–338 (1989) (hereinafter the "Miller Article"), which is herein incorporated by reference, and includes reactions of $CH_4$ oxidation, $H_2$—$O_2$ interaction, and $NO_x$ formation and destruction. The CHEMKIN-II kinetic program developed by Sandia National Laboratories was used for modeling. All reverse reactions were also taken into account.

EXAMPLE 1

Figure 3:
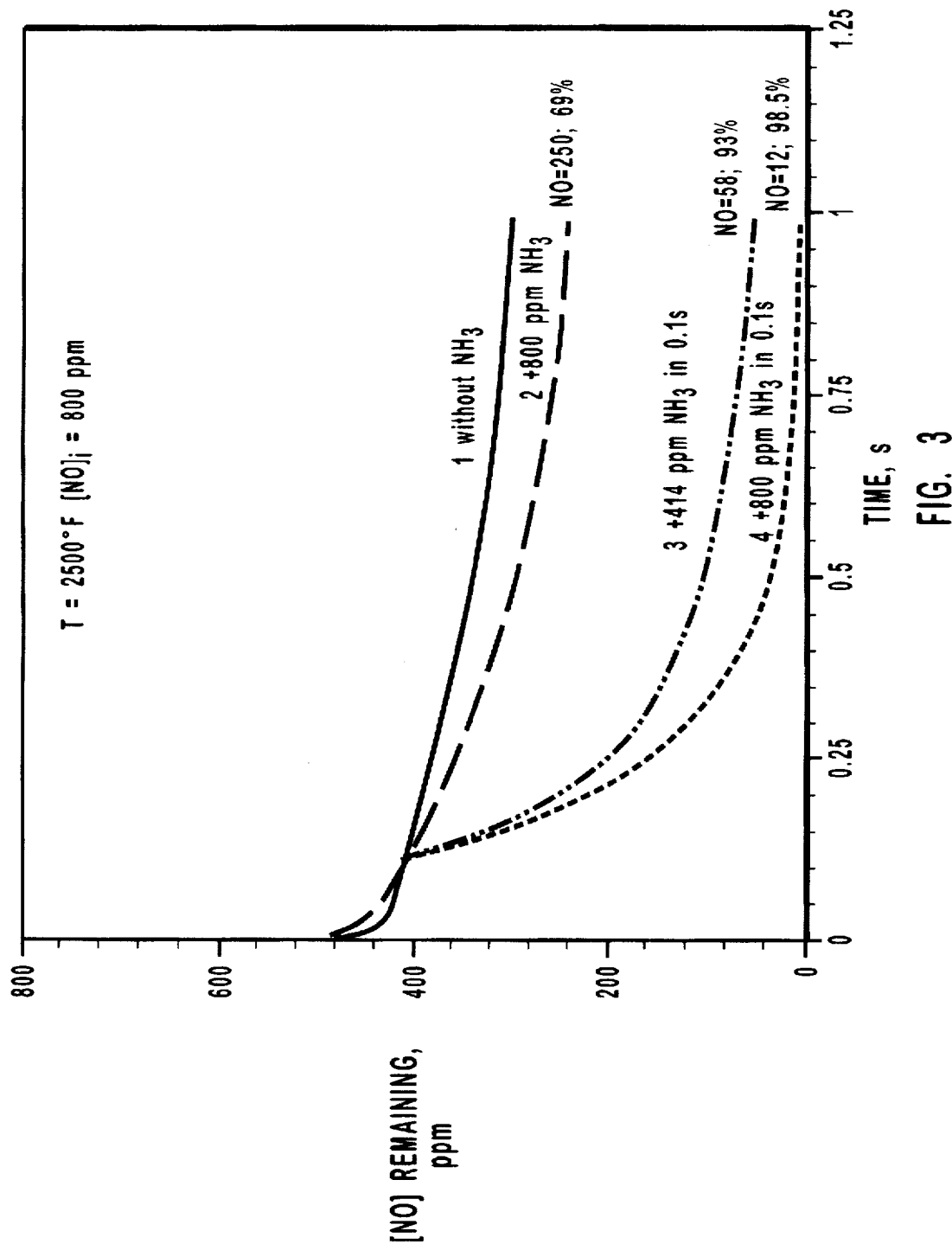
FIG. 3 is a graph representing the modeling data for reburning at a stoichiometric ratio of 0.9 in the reburning zone, with and without delayed ammonia injection into the reburning zone.

Kinetic modeling was performed to demonstrate the efficiency of delayed ammonia injection into the reburning zone. FIG. 3 is a graph representing the modeling data for the reburning at a stoichiometric ratio of 0.9 in the reburning zone, both with and without delayed ammonia injection into the reburning zone. The results of calculations that demonstrate the effect of NO reduction by gas reburning in the presence of ammonia ($NH_3$) are presented in FIG. 3 by curves 1–4 described as follows:

Curve 1 models basic reburning, when $CH_4$ is added to the reburning zone at 2500° F. The initial concentration of NO ($[NO]_i$) is 800 ppm, which decreases in 1 second to 313 ppm, or a 61% NO reduction, consistent with experimental data for basic reburning;

Curve 2 shows the results of adding 800 ppm of $NH_3$ simultaneously with the reburning fuel. In 1 second, the NO concentration is reduced to 250 ppm, which is a 69% NO reduction. Thus, the addition of $NH_3$ is not very effective in the presence of oxygen. The oxygen prevents NO reduction because the added $NH_3$ or other $NH_i$ precursors burn out rapidly in the presence of $O_2$.

Curve 3 shows the results of adding 414 ppm of $NH_3$ after the reburning fuel, with a 0.1 second time delay, after the $O_2$ concentration has decreased through reaction with the reburning fuel. After a 1 second reaction time, the NO concentration drops to 58 ppm, equivalent to the NO remaining at this time, which is a 93% NO reduction after the delayed addition of the $NH_3$.

Curve 4 shows the results of adding 800 ppm of $NH_3$ with a delay time of 0.1 seconds under the same conditions as those for Curve 3. After a 1 second reaction time, the NO concentration drops to 12 ppm, which is a 98.5% NO reduction.

Thus, the addition of a small amount of ammonia into the reburning zone significantly improves $NO_x$ reduction if the $NH_i$ species are produced shortly after introduction of the reburning fuel.

EXAMPLE 2

Modeling experiments were also run to simulate the burnout conditions when OFA is injected with ammonia and sodium carbonate. It was assumed for modeling that sodium carbonate dissociates rapidly under reburning conditions and Na atoms are formed. The Na atoms can react with ammonia to form $NaNH_2$, with decomposition thereof responsible for the formation of $NH_2$ radicals. The mechanism assumed for modeling was based on the Miller Article discussed above, with addition of hypothetical $NaNH_2$ reactions. The unknown rate constants for the sodium reactions were varied in modeling.

Figure 4:
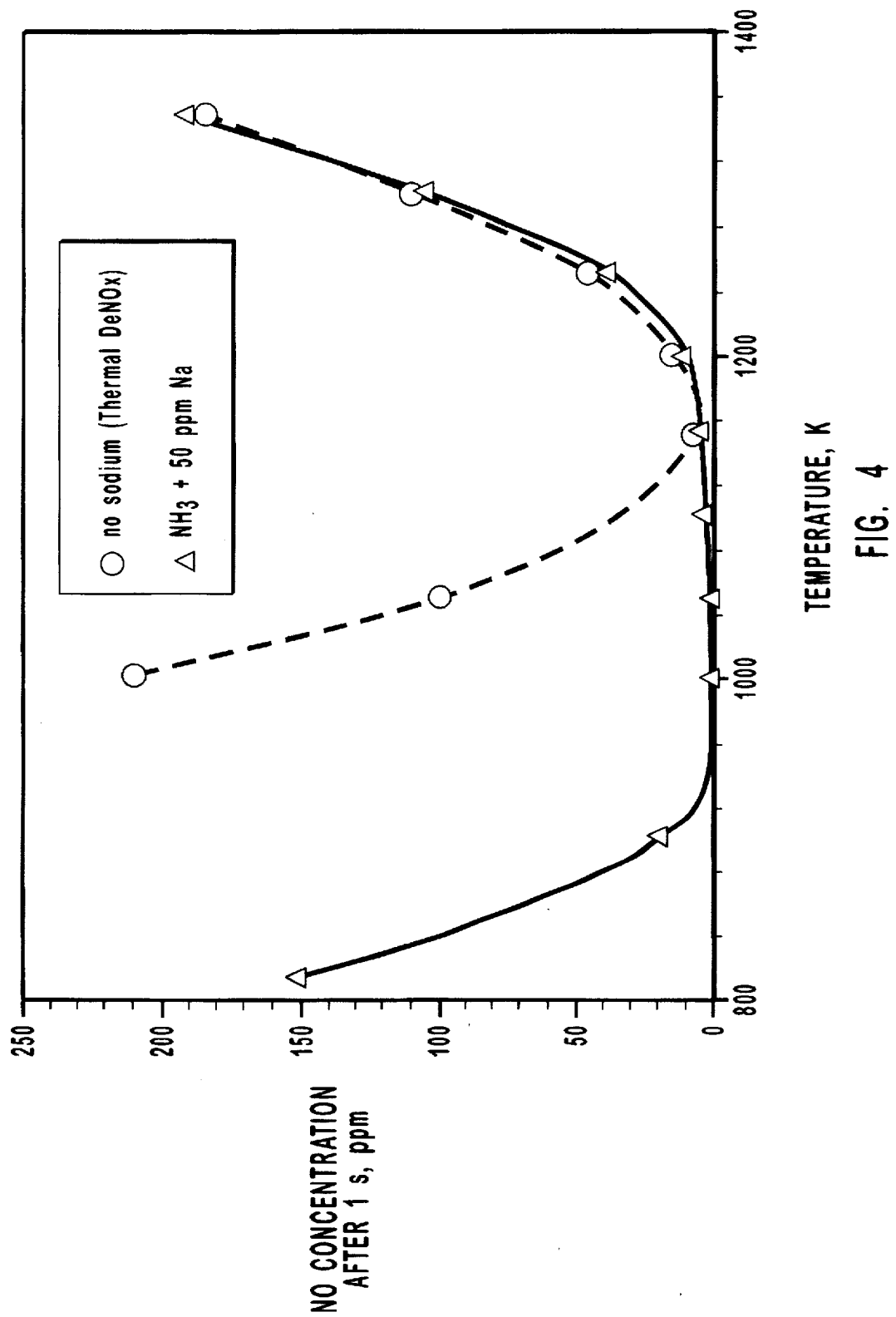
FIG. 4 is a graph representing the modeling data under conditions of simulated overfire air injection with ammonia, in the presence and in the absence of sodium compounds.

FIG. 4 is a graph representing the modeling data with ammonia in the presence and in the absence of sodium compounds. FIG. 4 compares the results of modeling without sodium and with the addition of 50 ppm Na atoms at different temperatures using theoretically reasonable values for the rate constants of the $NaNH_2$ reactions. The initial mixture composition was 1.3% $O_2$, 225 ppm NO, 450 ppm $NH_3$, and the balance $N_2$. The NO concentration is shown for a residence time of 1 second. FIG. 4 shows that the additional $NH_2$ radicals formed from $NaNH_2$ can promote NO reduction. The modeling results qualitatively demonstrate that the reaction window becomes deeper and wider to lower temperatures with small Na additives.

EXAMPLE 3

Tests with injection of N-agents and promoters into the reburning zone were conducted at a 1 MBtu/hr boiler simulator facility (BSF). The BSF was a down-fired combustion research facility designed to simulate the thermal characteristics of a utility boiler. The BSF consisted of a variable swirl diffusion burner, a vertical radiant furnace, and a horizontal convective pass. The facility's burner was equipped to fire coal, oil, or natural gas. The furnace was constructed of eight modular refractory lined spool sections with access ports. The furnace had an inside diameter of 22 inches and a height of 18 feet, and the radiant thereof was equipped with adjustable heat removal panels. The configuration of these panels could be adjusted such that the BSF matched the residence time-temperature profile and furnace exit gas temperature of a specific full scale boiler. The convective pass was equipped with air-cooled tube bundles designed to simulate the superheater and economizer sections of a coal fired boiler.

The tests were conducted with natural gas as the main and reburning fuel. The reburning fuel accounted for 10% of total facility heat input, corresponding to a reburning zone SR of 0.99. The initial $NO_x$ concentration was 530 ppm. N-agents, including urea or aqueous ammonia, were injected into the fuel rich reburn zone. Sodium carbonate was used as a promoter at a concentration of 100 ppm in the flue gas. The OFA temperature was 1800° F. Test variables included the NSR and delay time between the reburn fuel and N-agent injection. The delay time was varied from 0 to 0.5 seconds. The NO control performance was significantly enhanced by delaying N-agent injection.

Figure 5A:
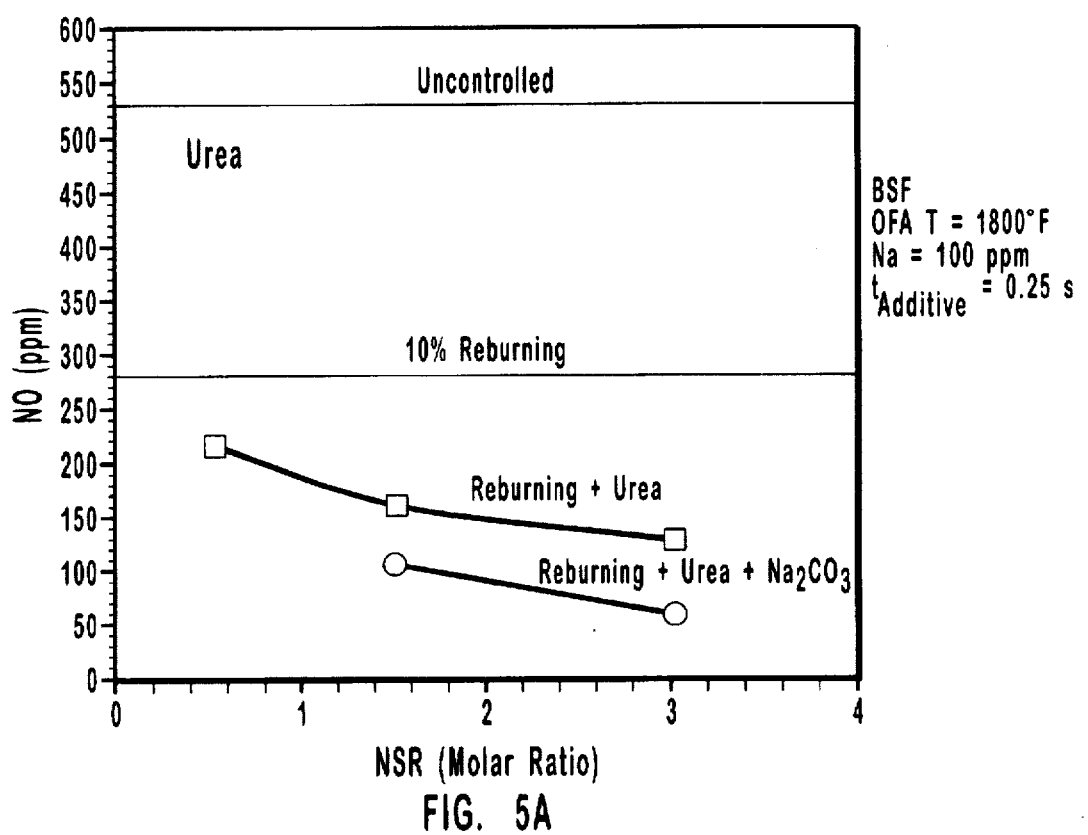
FIGS. 5A and 5B are graphs representing the NO removal efficiency after injection of 10% reburning fuel and downstream injection of urea and ammonia, with and without sodium carbonate, at different N-Agent/NO molar ratios.
Figure 5B:
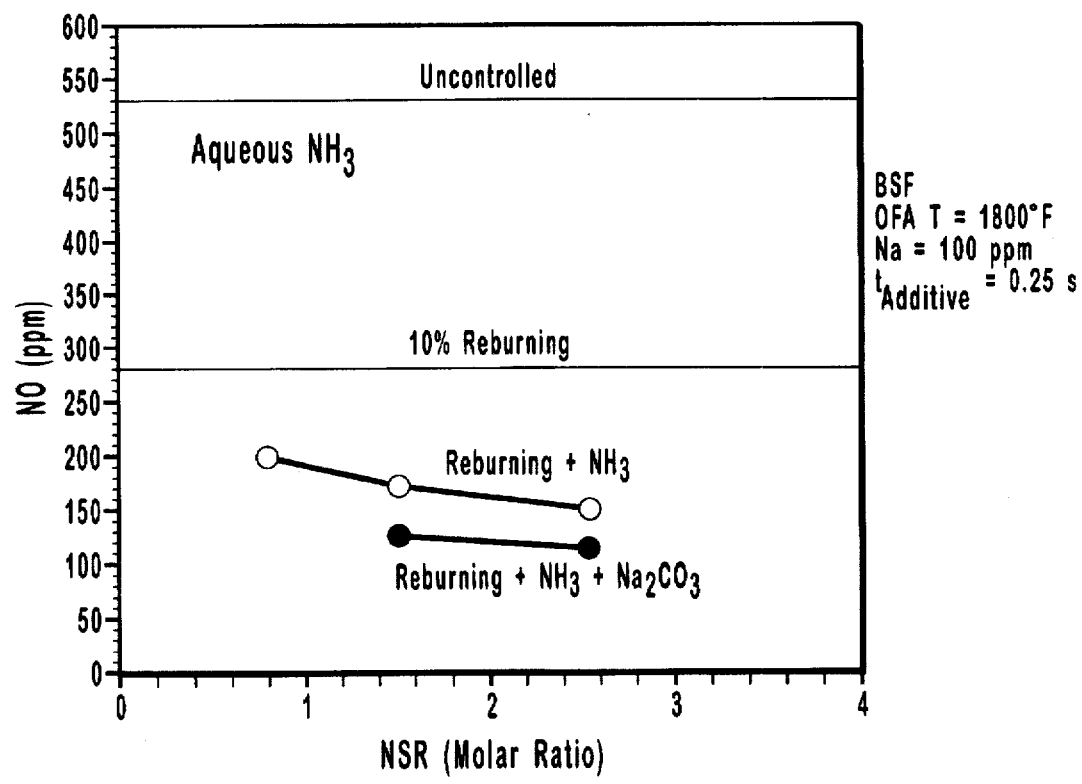

FIGS. 5A and 5B are graphs representing the NO removal efficiency after injection of the reburning fuel and downstream injection of urea and ammonia, with and without sodium carbonate at different N-Agent/NO molar ratios (NSR). FIGS. 5A and 5B show the impact of NSR at a delay time of 0.25 seconds upon $NO_x$ emissions for urea and aqueous ammonia, respectively. As expected, $NO_x$ reduction increased with increasing NSR. Reburning itself gave about a 45% $NO_x$ reduction. The N-agent and $Na_2CO_3$ promoter gave incremental $NO_x$ reductions of about 48% and 52%, respectively. Maximum overall $NO_x$ reduction was about 85% for the combined process. This example illustrates that NO removal is increased if N-agents are injected with a time delay into the reburning zone. Removal of NO is also greater in the presence of promoters.

EXAMPLE 4

Experimental tests were conducted at a BSF, like that described in Example 3, to investigate the promotion of NO removal under simulated conditions of overfire air/N-agent/ promoter injection. In these tests, natural gas was fired under fuel lean conditions with a concentration of 3.8% $O_2$, and N-agents with or without promoters were injected at different temperatures. The initial $NO_x$ concentrations were 200 and 500 ppm, and the NSR was 1.5.

Figure 6A:
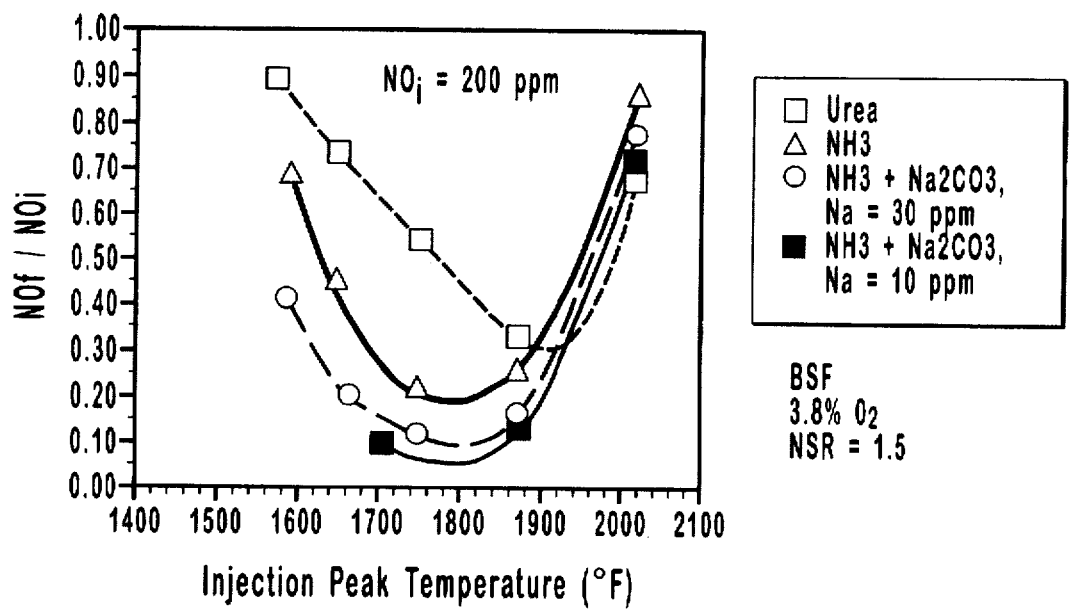
FIGS. 6A and 6B are graphs representing the NO removal efficiency under conditions of simulated overfire air injection with addition of urea and ammonia in the presence and in the absence of sodium carbonate.
Figure 6B:
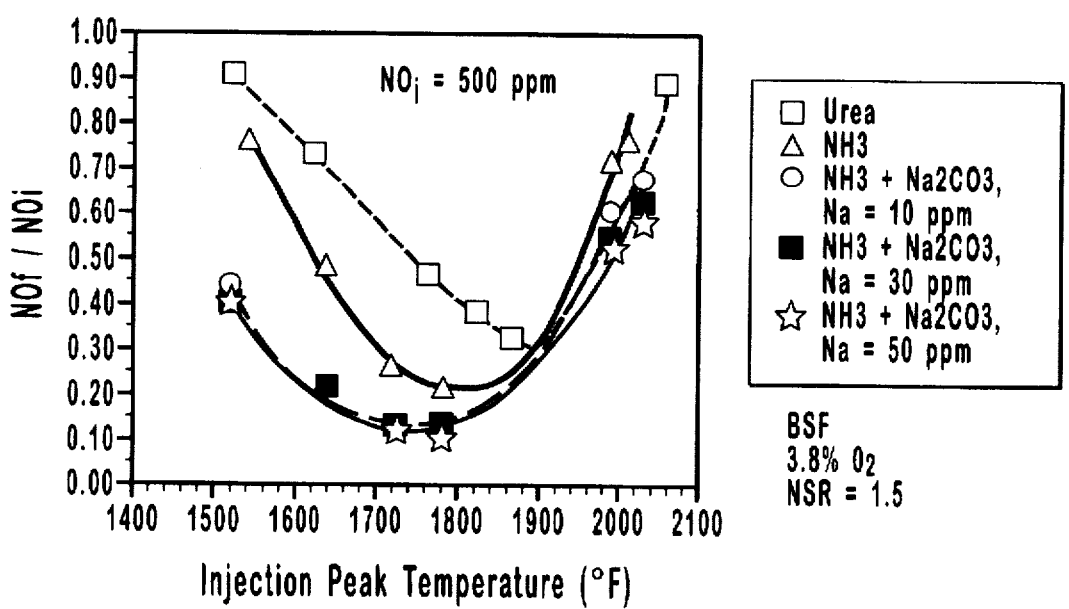

FIGS. 6A and 6B are graphs representing the NO removal efficiency, calculated as the ratio of the final NO concentration ($NO_f$) over the initial NO concentration ($NO_i$), after addition of urea or ammonia with and without sodium carbonate. As shown in FIGS. 6A and 6B, the addition of sodium carbonate to ammonia significantly extended the reaction window to lower temperatures and enhanced the $NO_x$ reduction efficiencies. Close to 90% $NO_x$ reduction was achieved at 1700° F. with the addition of only 10 ppm $Na_2CO_3$. An increase in the promoter concentration to 30 ppm did not substantially affect the NO reduction. This example illustrates that promoters are capable of widening the temperature window for NO removal as well as enhancing NO removal.

The present invention may be embodied in various specific forms without departing from its spirit or essential characteristics. The above described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A method for reducing nitrogen oxides in combustion flue gas comprising the steps of:
    (a) injecting a reburning fuel at a temperature in a range from about 2000° F. to about 3000° F. into combustion flue gas including oxygen and nitrogen oxides thereby forming a fuel rich area in a reburning zone;
    (b) passing a resulting mixture of reaction products from the fuel rich area of the reburning zone into an overfire air zone;
    (c) introducing a stream of overfire air at a temperature in a range from about 1100° F. to about 2400° F. into the overfire air zone;
    (d) injecting a reducing agent into the combustion flue gas along with the overfire air, the reducing agent providing a source of nitrogenous reducing species and being a precursor of nitrogenous radicals, the reducing agent selected from the group consisting of ammonia, urea, cyanuric acid, ammonium sulfate, ammonium bisulfate, ammonium sulfite, ammonium bisulfite, ammonium formate, ammonium carbonate, ammonium bicarbonate, biuret, triuret, ammelide, and mixtures thereof;
    (e) injecting a promoter compound along with the reducing agent to enhance the effectiveness of the reducing agent, the promoter compound selected from the group consisting of oxides, hydroxides, carbonates, sesquicarbonates, bicarbonates, phosphates, silicates, nitrates, formates, acetates, benzoates, citrates, gluconates, aluminates, borates, and mixtures thereof, the promoter compound including a metal selected from the group consisting of lithium, sodium, potassium, barium, zinc, aluminum, and combinations thereof, the molar ratio of the promoter compound to the reducing agent being in a range from about 0.01 to about 1; and
    (f) allowing the reducing agent to react within the combustion flue gas for a sufficient time to reduce the nitrogen oxides in the combustion flue gas.

2. The method of claim 1, wherein the stoichiometric ratio of oxygen to fuel in the fuel rich area of step (a) is at least about 0.75.

3. The method of claim 1, wherein the reburning fuel is selected from the group consisting of coal, natural gas, oil, biomass, municipal waste products, industrial waste products, and mixtures thereof.

4. The method of claim 3, wherein the reburning fuel is a product of pyrolysis or gasification.

5. The method of claim 1, wherein the promoter compound is from a fuel.

6. The method of claim 1, wherein the molar ratio of the reducing agent to NO in the overfire air zone is in a range from about 0.5 to about 3.

7. The method of claim 1, wherein the reducing agent and the promoter compound are injected into the stream in a form selected from the group consisting of solutions, slurries, solid particles, molten substances, gaseous products, and mixtures thereof.

8. The method of claim 7, wherein the reducing agent and the promoter compound are distributed by a substance selected from the group consisting of nitrogen, steam, air, recirculation gases, reburning fuel, and mixtures thereof.

9. The method of claim 1, wherein the reducing agent is from a fuel or is formed or released from the fuel prior to injecting into the reburning zone by a process selected from the group consisting of pyrolysis, gasification, physical separation, and chemical separation.

10. The method of claim 1, wherein the promoter compound is from a fuel or is formed or released from the fuel prior to injecting into the stream of overfire air by a process selected from the group consisting of pyrolysis, gasification, physical separation, and chemical separation.

11. A method for reducing nitrogen oxides in combustion flue gas comprising the steps of:
    (a) injecting a reburning fuel at a temperature in a range from about 2000° F. to about 3000° F. into combustion flue gas including oxygen and nitrogen oxides;
    (b) allowing the reburning fuel to react within the combustion flue gas for a sufficient time to remove a substantial portion of the oxygen, thereby forming a fuel rich area in a reburning zone;
    (c) injecting a reducing agent into the combustion flue gas in the fuel rich area at a temperature in a range from about 1900° F. to about 3000° F., the reducing agent providing a source of nitrogenous reducing species and being a precursor of nitrogenous radicals, the reducing agent injected such that a predetermined time delay between injection of the reburning fuel and the reducing agent is from about 0.01 to about 1 second, the reducing agent selected from the group consisting of ammonia, urea, cyanuric acid, ammonium sulfate, ammonium bisulfate, ammonium sulfite, ammonium bisulfite, ammonium formate, ammonium carbonate, ammonium bicarbonate, biuret, triuret, ammelide, and mixtures thereof:

(d) injecting a promoter compound along with the reducing agent to enhance the effectiveness of the reducing agent, the promoter compound selected from the group consisting of oxides, hydroxides, carbonates, sesquicarbonates, bicarbonates, phosphates, silicates, nitrates, formates, acetates, benzoates, citrates, gluconates, aluminates, borates, and mixtures thereof, the promoter compound including a metal selected from the group consisting of lithium, sodium, potassium, barium, zinc, aluminum, and combinations thereof, the molar ratio of the promoter compound to the reducing agent being in a range from about 0.01 to about 1;

(e) allowing the reducing agent to react within the combustion flue gas for a sufficient time to reduce the nitrogen oxides in the combustion flue gas; and (f) introducing a stream of overfire air at a temperature in a range from about 1100° F. to about 2400° F. into the combustion flue gas after injecting the reducing agent and the promoter compound.

12. The method of claim 11, wherein the stoichiometric ratio of oxygen to fuel in the fuel rich area of step (b) is at least about 0.75.

13. The method of claim 11, wherein the reburning fuel reacts with the combustion flue gas in step (b) for a period of time from about 0.01 s to about 1 s.

14. The method of claim 11, wherein the reburning fuel is selected from the group consisting of coal, natural gas, oil, biomass, municipal waste products, industrial waste products, and mixtures thereof.

15. The method of claim 14, wherein the reburning fuel is a product of pyrolysis or gasification.

16. The method of claim 11, wherein the promoter compound is from a fuel.

17. The method of claim 11, wherein the molar ratio of the reducing agent to NO in the combustion flue gas is in a range from about 0.2 to about 2.

18. The method of claim 11, wherein the reducing agent and the promoter compound are injected into the combustion flue gas in a form selected from the group consisting of solutions, slurries, solid particles, molten substances, gaseous products, and mixtures thereof.

19. The method of claim 18, wherein the reducing agent and the promoter compound are distributed by a substance selected from the group consisting of nitrogen, steam, air, recirculation gases, reburning fuel, pyrolysis gases, and mixtures thereof.

20. The method of claim 11, wherein the reducing agent is part of a fuel or is formed or released from the fuel directly in the reburning zone or in a separate reactor before injection by a process selected from the group consisting of pyrolysis, gasification, physical separation, and chemical separation.

21. The method of claim 11, wherein the promoter compound is part of a fuel or is formed or released from the fuel directly in the reburning zone or in a separate reactor before injection by a process selected from the group consisting of pyrolysis, gasification, physical separation, and chemical separation.

22. The method of claim 11, wherein the reducing agent is injected with the reburning fuel, the reducing agent being in the form selected from the group consisting of a solution, a slurry, solid particles, and a molten substance, whereby the reducing agent is formed as a gaseous product in the reburning zone due to a melting or vaporization process which provides a time delay for substantial removal of the oxygen.

23. The method of claim 11, wherein the promoter compound is injected with the reburning fuel, the promoter compound being in the form selected from the group consisting of a solution, a slurry, solid particles, and a molten substance, whereby the promoter compound is formed as a gaseous product in the reburning zone due to melting, vaporization, or chemical processes.

24. The method of claim 11, wherein the reburning fuel and the reducing agent are injected at the same distance from a main combustion zone through injector devices that are designed to provide contact of the reburning fuel with the combustion flue gas from the main combustion zone first, and then contact of the combustion flue gas under fuel rich conditions with the reducing agent.

25. The method of claim 11, wherein the reburning fuel and the promoter compound are injected at the same distance from a main combustion zone.

26. A method for reducing nitrogen oxides in combustion flue gas comprising the steps of:

(a) injecting a reburning fuel at a temperature in a range from about 2000° F. to about 3000° F. into combustion flue gas including oxygen and nitrogen oxides;

(b) allowing the reburning fuel to react within the combustion flue gas for a sufficient time to remove a substantial portion of the oxygen, thereby forming a fuel rich area in a reburning zone;

(c) injecting a reducing agent into the combustion flue gas in the fuel rich area at a temperature in a range from about 1900° F. to about 3000° F., the reducing agent providing a source of nitrogenous reducing species and being a precursor of nitrogenous radicals, the reducing agent injected such that a predetermined time delay between injection of the reburning fuel and the reducing agent is from about 0.01 to about 1 second, the reducing agent selected from the group consisting of ammonia, urea, cyanuric acid, ammonium sulfate, ammonium bisulfate, ammonium sulfite, ammonium bisulfite, ammonium formate, ammonium carbonate, ammonium bicarbonate, biuret, triuret, ammelide, and mixtures thereof;

(d) injecting a promoter compound along with the reducing agent to enhance the effectiveness of the reducing agent, the promoter compound selected from the group consisting of oxides, hydroxides, carbonates, sesquicarbonates, bicarbonates, phosphates, silicates, nitrates, formates, acetates, benzoates, citrates, gluconates, aluminates, borates, and mixtures thereof, the promoter compound including a metal selected from the group consisting of lithium, sodium, potassium, barium, zinc, aluminum, and combinations thereof, the molar ratio of the promoter compound to the reducing agent being in a range from about 0.01 to about 1;

(e) allowing the reducing agent to react within the combustion flue gas for a sufficient time to reduce the nitrogen oxides in the combustion flue gas;

(f) introducing a stream of overfire air at a temperature in a range from about 1100° F. to about 2400° F. into the combustion flue gas after injecting the reducing agent and the promoter compound;

(g) injecting an additional reducing agent into the combustion flue gas along with the overfire air, the additional reducing agent providing a source of nitrogenous reducing species and being a precursor of nitrogenous radicals; and (h) injecting an additional promoter compound along with the additional reducing agent to enhance the effectiveness of the additional reducing agent, the molar ratio of the additional promoter compound to the additional reducing agent being in a range from about 0.01 to about 1.

27. The method of claim 26, wherein the stoichiometric ratio of oxygen to fuel in the fuel rich area of step (b) is at least about 0.75.

28. The method of claim 26, wherein the reburning fuel reacts with the combustion flue gas in step (b) for a period of time from about 0.01 s to about 1 s.

29. The method of claim 26, wherein the reburning fuel is selected from the group consisting of coal, natural gas, oil, biomass, municipal waste products, industrial waste products, and mixtures thereof.

30. The method of claim 29, wherein the reburning fuel is a product of pyrolysis or gasification.

31. The method of claim 26, wherein the additional reducing agent is selected from the group consisting of ammonia, urea, cyanuric acid, ammonium sulfate, ammonium bisulfate, ammonium sulfite, ammonium bisulfite, ammonium formate, ammonium carbonate, ammonium bicarbonate, biuret, triuret, ammelide, and mixtures thereof.

32. The method of claim 26, wherein the promoter compound is from a fuel.

33. The method of claim 26, wherein the additional promoter compound is a metal compound selected from the group consisting of oxides, hydroxides, carbonates, sesquicarbonates, bicarbonates, phosphates, silicates, nitrates, formates, acetates, benzoates, citrates, gluconates, aluminates, borates, and mixtures thereof.

34. The method of claim 33, wherein the additional promoter compound includes a metal selected from the group consisting of lithium, sodium, potassium, barium, zinc, aluminum, and combinations thereof.

35. The method of claim 26, wherein the molar ratio of the reducing agent to NO in the combustion flue gas in step (c) is in a range from about 0.2 to about 2, and the molar ratio of the additional reducing agent to NO in the combustion flue gas in step (g) is in a range from about 0.5 to about 3.

36. The method of claim 26, wherein the reducing agent and the promoter compound are injected into the combustion flue gas in a form selected from the group consisting of solutions, slurries, solid particles, molten substances, gaseous products, and mixtures thereof.

37. The method of claim 36, wherein the reducing agent and the promoter compound are distributed by a substance selected from the group consisting of nitrogen, steam, air, recirculation gases, reburning fuel, pyrolysis gases, and mixtures thereof.

38. The method of claim 26, wherein the reducing agent of step (c) is part of a fuel or is formed or released from the fuel directly in the reburning zone or in a separate reactor before injection by a process selected from the group consisting of pyrolysis, gasification, physical separation, and chemical separation.

39. The method of claim 26, wherein the promoter compound of step (d) is part of a fuel or is formed or released from the fuel directly in the reburning zone or in a separate reactor before injection by a process selected from the group consisting of pyrolysis, gasification, physical separation, and chemical separation.

40. The method of claim 26, wherein the reducing agent of step (c) is injected with the reburning fuel, the reducing agent being in the form selected from the group consisting of a solution, a slurry, solid particles, and a molten substance, whereby the reducing agent is formed as a gaseous product in the reburning zone due to melting or vaporization process which provide a time delay for removal of the oxygen.

41. The method of claim 26, wherein the promoter compound of step (d) is injected with the reburning fuel, the promoter compound being in the form selected from the group consisting of a solution, a slurry, solid particles, and a molten substance, whereby the promoter compound is formed as a gaseous product in the reburning zone due to melting, vaporization, or chemical processes.

42. The method of claim 26, wherein the reburning fuel and the reducing agent of step (c) are injected at the same distance from a main combustion zone through injector devices that are designed to provide contact of the reburning fuel with the combustion flue gas from the main combustion zone first, and then contact of the combustion flue gas under fuel rich conditions with the reducing agent.

43. The method of claim 26, wherein the reburning fuel and the promoter compound are injected at the same distance from a main combustion zone.

* * * * *

UNITED STATES PATENT AND TRADEMARK OFFICE
CERTIFICATE OF CORRECTION

PATENT NO. : 5,756,059
DATED : May 26, 1998
INVENTOR(S) : Valdimir M. Zamansky; Peter M. Maly; William Randall It is certified that error appears in the above-identified patent and that said Letters Patent is hereby corrected as shown below:

Col. 6, line 36, after "using" change "NH," to -- $NH_i$ --

Col. 8, line 29, after "obtained" change "i n" to --in--

Col. 9, line 39, before "about" change "0.8to" to --0.8 to--

Col. 10, line 10, after "of" change "fuels or example" to --fuels. For example--

Col. 10, line 49, after "of" change "out" to --about--

Col. 13, line 8, after "NaO" delete first occurance of --+--

Col. 13, line 25, after "15" change "Prpg. energy" to --Prog. Energy--

Signed and Sealed this

Thirtieth Day of March, 1999

*Attest:*

Q. TODD DICKINSON

*Attesting Officer*   Acting Commissioner of Patents and Trademarks